(12) United States Patent
Terada

(10) Patent No.: US 7,542,661 B2
(45) Date of Patent: Jun. 2, 2009

(54) METHOD, APPARATUS, AND PROGRAM FOR IMAGE GENERATION

(75) Inventor: Masahiro Terada, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 702 days.

(21) Appl. No.: 10/628,470

(22) Filed: Jul. 29, 2003

(65) Prior Publication Data
US 2004/0022522 A1    Feb. 5, 2004

(30) Foreign Application Priority Data
Jul. 29, 2002    (JP)    ............... 2002-219635

(51) Int. Cl.
*H04N 7/00*    (2006.01)
(52) U.S. Cl. .................................. 386/105; 386/46
(58) Field of Classification Search .................. 386/95, 386/96, 105, 106, 120, 121, 45, 46
See application file for complete search history.

(56) References Cited

U.S. PATENT DOCUMENTS

2002/0154895 A1* 10/2002 Maruyama et al. ............ 386/95
2002/0178450 A1* 11/2002 Morita et al. ................. 725/61

FOREIGN PATENT DOCUMENTS

| JP | 11-187337 A | 7/1999 |
| JP | 2000-083221 A | 3/2000 |
| JP | 2000-149043 A | 5/2000 |
| JP | 2000-350150 A | 12/2000 |

* cited by examiner

*Primary Examiner*—Robert Chevalier
(74) *Attorney, Agent, or Firm*—Sughrue Mion, PLLC

(57) ABSTRACT

Serial reproduction digital video data in the form of a slide show can be easily generated from still image data and/or digital video data. Reading means reads still image data sets and/or digital video data sets stored in folders of a memory card, and selection of one of the folders is received. The still image data sets and/or the digital video data sets in the selected folder are arranged in order of photography, and a serial reproduction digital video data set can be generated.

23 Claims, 4 Drawing Sheets

FIG.4

| IMAGES | DSCF0001.JPG | DSCF0002.JPG | DSCF0003.AVI | DSCF0004.JPG |
|---|---|---|---|---|
| CAPTION 1 | 100-0001 | 100-1002 | NOT AVAILABLE | 100-1003 |
| CAPTION 2 | 2002/6/28 | 2002/6/29 | NOT AVAILABLE | 2002/6/29 |
| SOUND | TUNE 1 | DSC SOUND | SOUND OF MOVING IMAGE A | TUNE 1 |

TIME →

METHOD, APPARATUS, AND PROGRAM FOR IMAGE GENERATION

BACKGROUND OF THE INVENTION

1. Field of the Invention

The present invention relates to an image generation method and an image generation apparatus for generating serial reproduction digital video data in the form of a slide show wherein still image data and/or digital video data digital video data obtained by a digital camera and the like are reproduced serially. The present invention also relates to a program that causes a computer to execute the image generation method.

2. Description of the Related Art

Following the spread of digital cameras, various still image data and digital video data can be obtained. In addition, various software called authoring tools have been provided for generating an image in the form of a slide show whereby still image data and digital video data are edited together on a personal computer.

By using such an authoring tool, a catalog of thumbnail images of still image data sets and digital video data sets is displayed, and a desired one of the still image data sets and/or digital video data sets is selected one by one from the catalog for generating an "movie". The selected still image data sets and/or digital video data sets are laid out in order of preference, and a digital video data set in the form of a slide show (hereinafter referred to as serial reproduction digital video data) is then generated.

Meanwhile, various methods have been proposed for easily editing multimedia information such as still image data and digital video data. For example, a method of smoothly changing data format has been proposed in Japanese Unexamined Patent Publication No. 2000-149043. In this method, when a scenario is generated for reproducing multimedia information, an actual file as a material to which the scenario is linked is linked to an actual file of the multimedia information generated by conversion of the data format thereof. In this manner, the data format can be changed smoothly. In Japanese Unexamined Patent Publication No. 2000-350150, a method of efficiently editing an image by reproducing an image at a desired speed has also been described.

However, even in the case where the method described in Japanese Unexamined Patent Publication No. 2000-149043 or 2000-350150 is used, the still image data sets and the digital video data sets included in the serial reproduction digital video data need to be selected manually from a plurality of still image data sets and digital video data sets, which makes generation of the serial reproduction digital video data tedious.

SUMMARY OF THE INVENTION

The present invention has been conceived based on consideration of the above circumstances. An object of the present invention is therefore to easily generate serial reproduction digital video data in the form of a slide show.

Still image data sets and digital video data sets obtained by a digital camera are written in a folder of a memory card according to time of generation thereof or the like, and the present invention pays attention to this fact.

An image generation method of the present invention is a method of generating serial reproduction digital video data wherein still image data sets and/or digital video data sets are reproduced serially, and the image generation method comprises the steps of:

receiving collective selection of the still image data sets and/or digital video data sets in a predetermined recording unit; and generating the serial reproduction digital video data by arranging the selected still image data sets and/or digital video data sets in predetermined order.

In the image generation method of the present invention, the predetermined recording unit may be a folder wherein the still image data sets and/or digital video data sets are stored.

In the image generation method of the present invention, the predetermined order may be determined based on accompanying information attached to the still image data sets and/or digital video data sets.

The accompanying information refers to tag information of the still image data sets and/or digital video data sets in the case where the still image data sets and/or digital video data sets are data sets of Exif format. The tag information includes information such as the date and time of photography, a file name, a photography location, and a data size regarding each of the still image data sets and/or digital video data sets. By referring to the information, the predetermined order is determined.

An image generation apparatus of the present invention is an apparatus for generating serial reproduction digital video data wherein still image data sets and/or digital video data sets are reproduced serially, and the image generation apparatus comprises:

selection reception means for receiving collective selection of the still image data sets and/or digital video data sets in a predetermined recording unit; and digital video data generation means for generating the serial reproduction digital video data by arranging the selected still image data sets and/or digital video data sets in predetermined order.

In the image generation apparatus of the present invention, the predetermined recording unit may be a folder wherein the still image data sets and/or digital video data sets are written.

In the image generation apparatus of the present invention, the digital video data generation means may determine the predetermined order based on accompanying information attached to the still image data sets and/or digital video data sets.

The image generation method of the present invention may be provided as a program that causes a computer to execute the image generation method.

According to the present invention, selection of the still image data sets and/or digital video data sets is received collectively according to the predetermined recording unit, and the serial reproduction digital video data are generated by arranging the selected still image data sets and/or digital video data sets in the predetermined order. Therefore, a user who generates the serial reproduction digital video data can generate the serial reproduction digital video data wherein the still image data sets and/or digital video data sets are arranged in the predetermined order by simply selecting the still image data sets and/or digital video data sets in the predetermined recording unit.

Furthermore, collective selection of the still image data sets and/or digital video data sets can be carried out easily by using the folder as the predetermined recording unit.

By determining the predetermined order according to the accompanying information, the still image data sets and/or digital video data sets can be arranged easily in the serial reproduction digital video data.

BRIEF DESCRIPTION OF THE DRAWINGS

FIG. 4 shows an example of serial reproduction digital video data; and

DESCRIPTION OF THE PREFERRED EMBODIMENT

Figure 1:
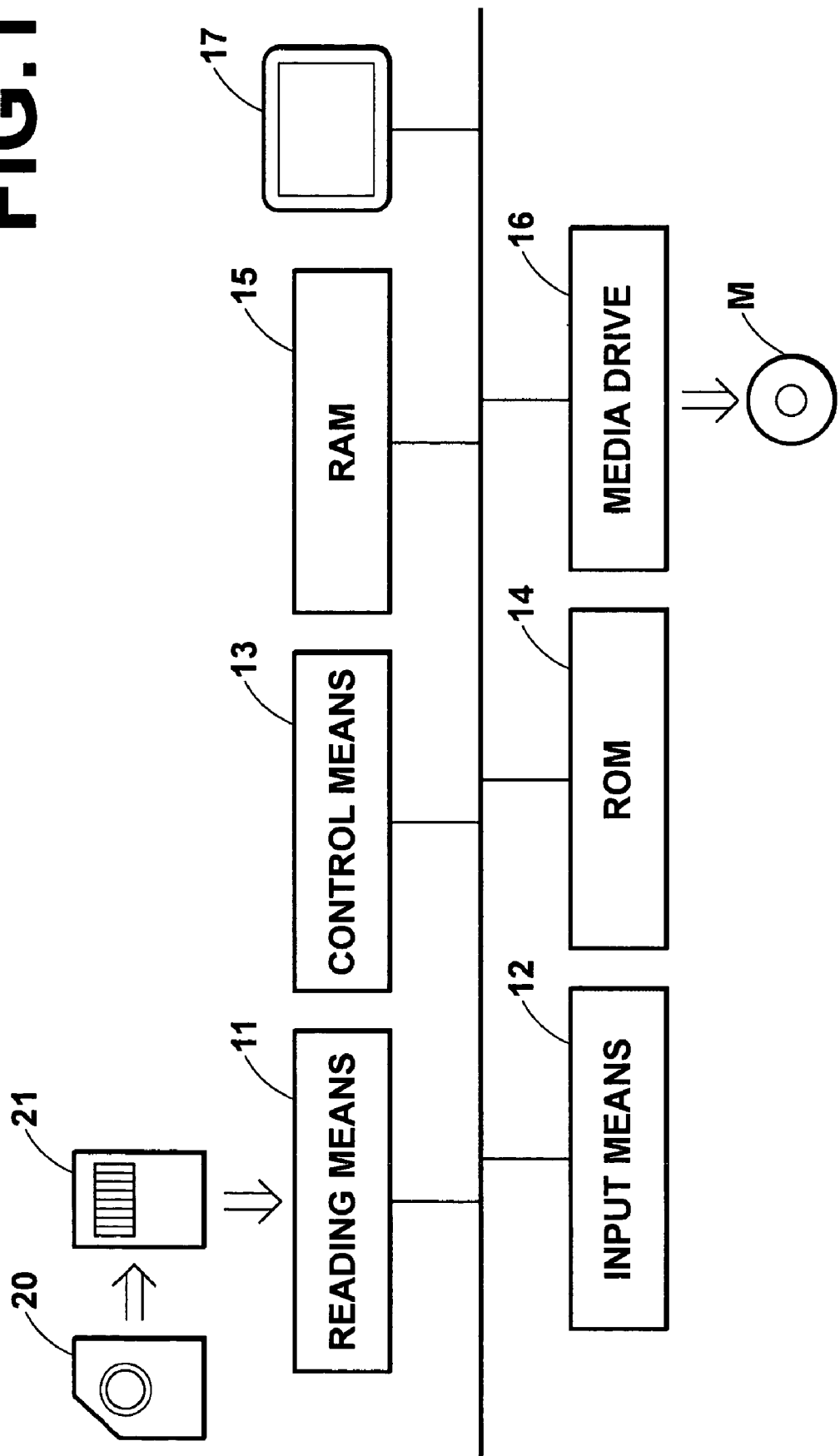
FIG. 1 is a block diagram showing a configuration of an image generation apparatus of an embodiment of the present invention.

Hereinafter, an embodiment of the present invention will be explained with reference to the accompanying drawings. FIG. 1 is a block diagram showing a configuration of an image generation apparatus in the embodiment. The image generation apparatus generates serial reproduction digital video data in the form of a slide show from still image data sets and/or digital video data sets obtained by photography with a digital camera.

As shown in FIG. 1, an image generation apparatus 1 in this embodiment comprises reading means 11 such as a card reader, input means 12, control means 13, a ROM 14, a RAM 15, a media drive 16, and a monitor 17. The reading means 11 reads still image data sets and/or digital video data sets obtained by photography with a digital camera 20 from a memory card 21. The input means 12 comprises a keyboard and a mouse used for various kinds of inputs. The control means 13 controls the image generation apparatus 1. The ROM 14 stores a control program for driving the control means 13. The RAM 15 is used as a work area. The media drive 16 records various data in a recording medium M such as a CD-R or a DVD-R. The monitor 17 is used for display.

Figure 2:
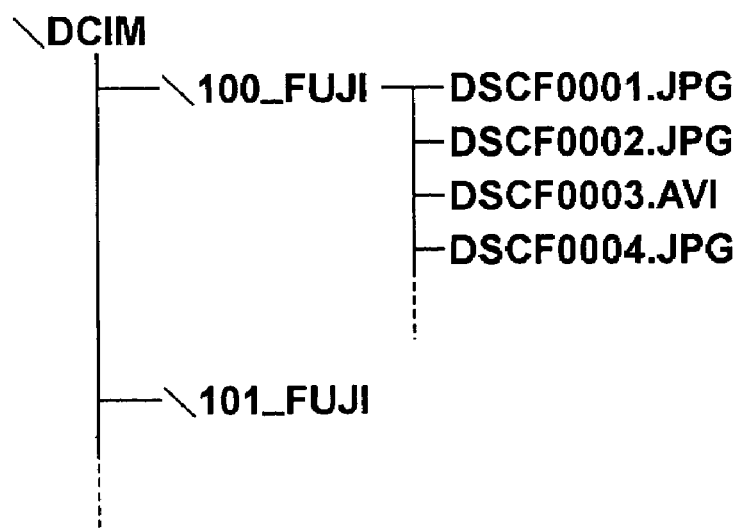
FIG. 2 shows an example of a folder structure.

The still image data sets and/or the digital video data sets obtained by the digital camera 20 are recorded in folders in the memory card 21. FIG. 2 shows an example of a structure of the folders. A folder "\DCIM" comes the highest in a hierarchy of the folders, and folders "\100-FUJI", "\101-FUJI" and the like storing the still image data sets and/or the digital video data sets are recorded under the \DCIM folder. In the example shown in FIG. 2, the still image data sets and the digital video data set having file names "DSCF0001.JPG", "DSCF0002.JPG", "DSCF0003.AVI", and "DSCF0004.JPG" are written in the folder \100-FUJI. The extensions "JPG" and "AVI" represent still image data sets and digital video data sets, respectively.

The ROM 14 stores the control program, and the control program drives the control means 13. More specifically, the control means 13 selects the still image data set or the digital video data set having the file name that comes first in each of the folders as a representative image, according to the control program. The control means 13 generates a thumbnail image of the representative image, and displays the thumbnail image on the monitor 17.

Figure 3:
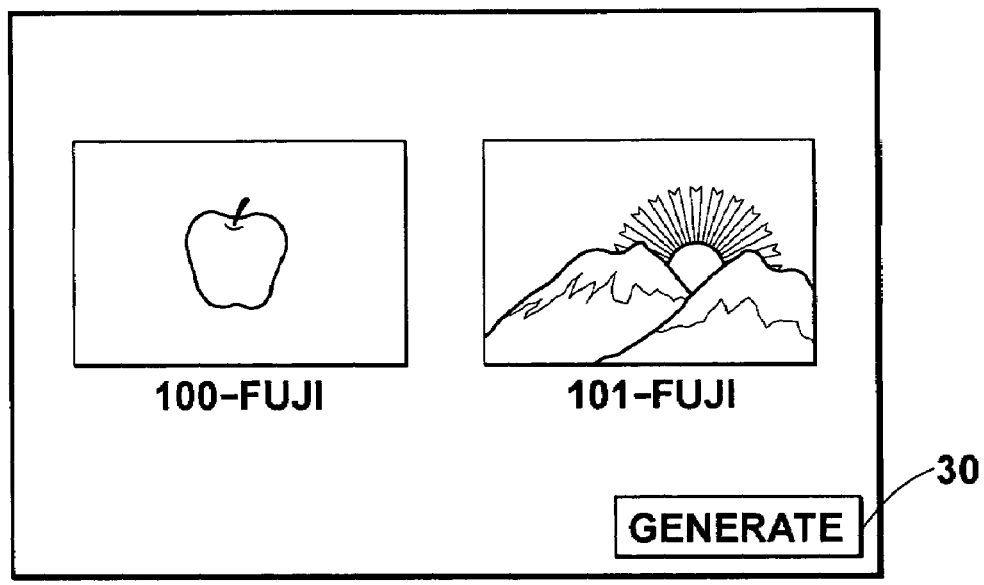
FIG. 3 shows an example of thumbnail images displayed on a monitor.

FIG. 3 shows an example of the thumbnail images of the representative images in the respective folders shown on the monitor 17. The control means 13 receives selection of one of the thumbnail images via the input means 12. If a "Generate" button 30 is clicked, the control means 13 generates a serial reproduction digital video data set R0 in the form of a slide show, by arranging in order of photography the still image data sets and/or the digital video data sets stored in the folder corresponding to the selected thumbnail image. In this embodiment, the folder \100-FUJI has been selected.

FIG. 4 shows an example of the serial reproduction digital video data set R0. The serial reproduction digital video data set R0 contains repetitive images of each of the still image data sets in the selected folder and moving images represented by the digital video data sets in the folder. The number of the repetitive images is determined so as to enable reproduction of each of the still images as a slide-show style moving image for 4 seconds, for example. The time is not necessarily limited to 4 seconds, and a user can set the time.

Character information such as a frame number and the date of photography can be added as a caption for each of frames in the serial reproduction digital video data set R0. Furthermore, audio data (such as tune 1 in FIG. 4) can be used for each of the image data sets. For example, the image data set DSCF0001.JPG in FIG. 4 has the caption "100-0001" representing the folder name and the file name and the caption "2002/6/28" representing the date of photography, and the tune 1 is given as background music.

In this manner, the caption and a sound such as the background music can be reproduced during image reproduction. The user sets the caption and the music to be added, by using the input means 12.

In the case where the digital camera 20 has a function of recording a sound during photography, the still image data sets may comprise image files and audio files representing the sound recorded at the time of photography. In such a case, the audio files comprising the still image data sets maybe included in the serial reproduction digital video data set R0 during generation of the serial reproduction digital video data set R0, as shown by the file DSCF0002.JPG in FIG. 4.

Figure 5:
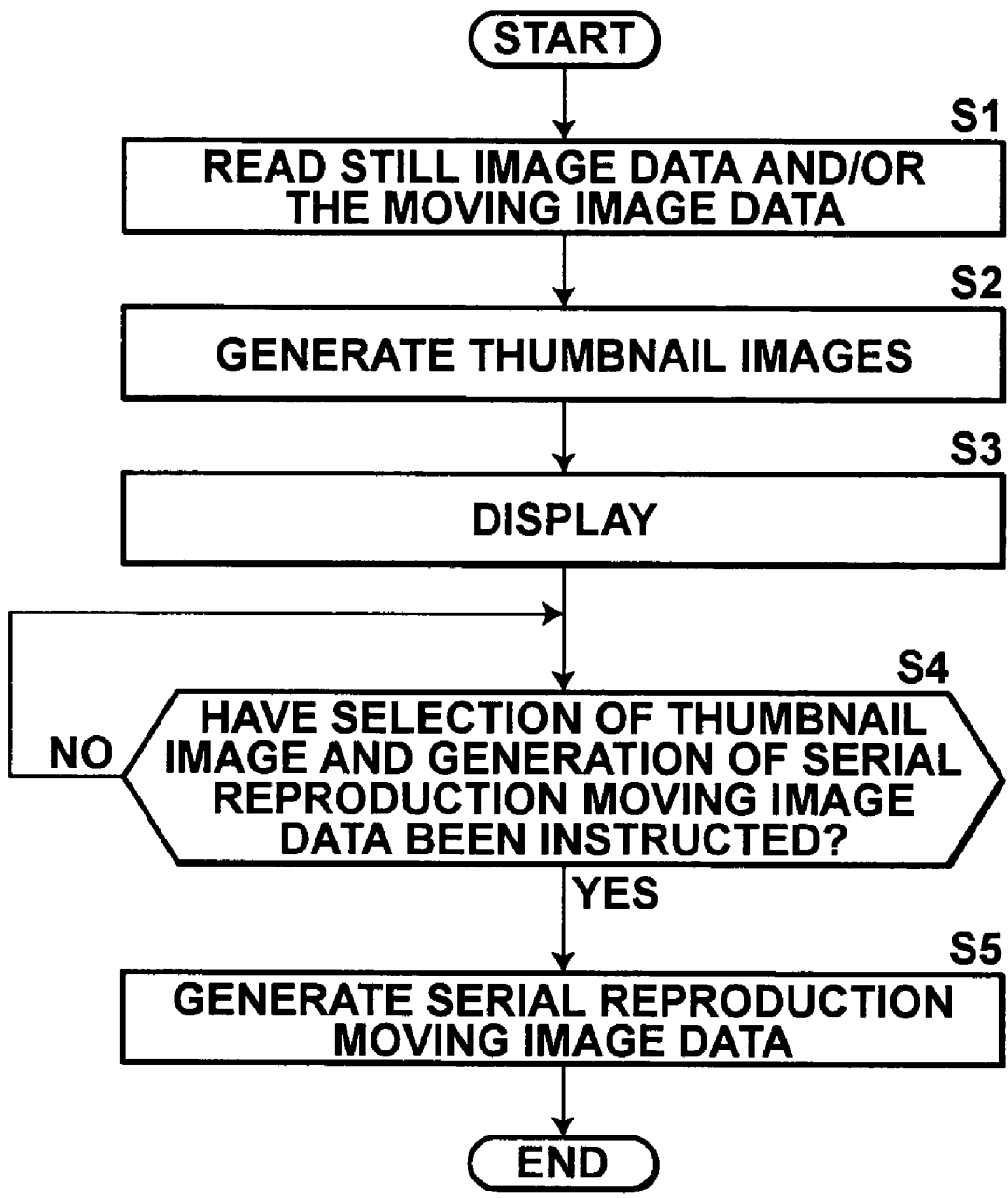
FIG. 5 is a flow chart showing procedures carried out in the embodiment.

The operation of this embodiment will be explained next. FIG. 5 is a flow chart showing procedures carried out in the embodiment. The reading means 11 reads the still image data sets and/or the digital video data sets stored in the folders in the memory card 21 (Step S1). The thumbnail image of the representative image of each of the folders is generated (Step S2), and displayed on the monitor 17 (Step S3). Whether instructions for selecting one of the thumbnail images and for generating the serial reproduction digital video data set R0 have been input is judged (Step S4). If a result at Step S4 is affirmative, the still image data sets and/or the digital video data sets stored in the selected folder are arranged in order of photography, and the serial reproduction digital video data set R0 is generated (Step S5) to end the operation.

The serial reproduction digital video data set R0 is displayed on the monitor 17 as a moving image in a slide show style, by a reproduction instruction from the user. The serial reproduction digital video data set R0 can be recorded in the recording medium M such as a CD-R or a DVD-R by the media drive 16.

As has been described above, according to this embodiment, by instructing generation of the serial reproduction digital video data set R0 after selection of the folder storing the still image data sets and/or the digital video data sets, the still image data sets and/or the digital video data sets in the selected folder are arranged in order of photography to generate the serial reproduction digital video data set R0. Therefore, the user can generate the serial reproduction digital video data set R0 having the still image data sets and/or the digital video data sets in order of photography, by simply selecting the folder.

In the above embodiment, the serial reproduction digital video data set R0 is generated by arranging the still image data sets and/or the digital video data sets in order of photography. However, the serial reproduction digital video data set R0 may be generated by arranging the still image data sets and/or the digital video data sets in order of file names. In the case where the still image data sets and/or the digital video data sets are of Exif format and tag information thereof has information on photography locations, the serial reproduction image data set R0 may be generated by arranging the still image data sets and/or the digital video data sets in order of photography locations (from north to south, for example).

What is claimed is:

1. An image generation method for generating serial reproduction digital video data wherein still image data sets and/or digital video data sets are reproduced serially, the image generation method comprising the steps of:
   receiving collective selection of the still image data sets and/or digital video data sets in predetermined recording units;
   receiving input of order specifying conditions that determine the order in which the still image data sets and/or the digital video data sets are reproduced;
   generating the serial reproduction digital video data by arranging the selected still image data sets and/or digital video data sets based on the order specifying conditions;
   arranging the still image data sets and/or digital video data sets that are received in predetermined recording units according to the order specifying conditions and storing the arranged still image data sets and/or digital video data sets in a folder; and
   selecting said folder to begin said generating the serial reproduction digital video data.

2. An image generation method as defined in claim 1, wherein the predetermined recording unit is a folder storing the still image data sets and/or digital video data sets.

3. An image generation method as defined in claim 1, wherein the order specifying conditions are based on accompanying information attached to the still image data sets and/or digital video data sets.

4. An image generation method as defined in claim 2, wherein the order specifying conditions are based on accompanying information attached to the still image data sets and/or digital video data sets.

5. An image generation method as defined in claim 3, wherein the accompanying information includes at least one item of information comprising the date and time of photography, a file name, a photography location, and a data size regarding each of the still image data sets and/or digital video data sets.

6. An image generation method as defined in claim 4, wherein the accompanying information includes at least one item of information comprising the date and time of photography, a file name, a photography location, and a data size regarding each of the still image data sets and/or digital video data sets.

7. An image generation apparatus for generating serial reproduction digital video data wherein still image data sets and/or digital video data sets are reproduced serially, the image generation apparatus comprising:
   selection reception means for receiving collective selection of the still image data sets and/or digital video data sets in predetermined recording units;
   order specifying condition reception means for receiving input of order specifying conditions that determine the order in which the still image data sets and/or the digital video data sets are reproduced;
   digital video data generation means for generating the serial reproduction digital video data by arranging the selected still image data sets and/or digital video data sets based on the order specifying conditions;
   data set arranging means for arranging the still image data sets and/or digital video data sets that are received in predetermined recording units according to the order specifying conditions and storing the arranged still image data sets and/or digital video data sets in a folder; and
   folder selecting means for selecting said folder to begin said generating the serial reproduction digital video data.

8. An image generation apparatus as defined in claim 7, wherein the predetermined recording unit is a folder storing the still image data sets and/or digital video data sets.

9. An image generation apparatus as defined in claim 7, wherein the order specifying conditions are based on accompanying information attached to the still image data sets and/or digital video data sets.

10. An image generation apparatus as defined in claim 8, wherein the order specifying conditions are based on accompanying information attached to the still image data sets and/or digital video data sets.

11. An image generation apparatus as defined in claim 9, wherein the accompanying information includes at least one item of information comprising the date and time of photography, a file name, a photography location, and a data size regarding each of the still image data sets and/or digital video data sets.

12. An image generation apparatus as defined in claim 10, wherein the accompanying information includes at least one item of information comprising the date and time of photography, a file name, a photography location, and a data size regarding each of the still image data sets and/or digital video data sets.

13. A computer-readable medium storing a program for causing a computer to generate serial reproduction digital video data wherein still image data sets and/or digital video data sets are reproduced serially, the computer-readable medium comprising:
   means for receiving collective selection of the still image data sets and/or digital video data sets in predetermined recording units;
   means for receiving input of order specifying conditions that determine the order in which the still image data sets and/or the digital video data sets are reproduced;
   means for generating the serial reproduction digital video data by arranging the selected still image data sets and/or digital video data sets based on the order specifying conditions;
   means for arranging the still image data sets and/or digital video data sets that are received in predetermined recording units according to the order specifying conditions and storing the arranged still image data sets and/or digital video data sets in a folder; and
   means for selecting said folder to begin said generating the serial reproduction digital video data.

14. A computer-readable medium storing a program as defined in claim 13, wherein the predetermined recording unit is a folder storing the still image data sets and/or digital video data sets.

15. A computer-readable medium storing a program as defined in claim 13, wherein the order specifying conditions are based on accompanying information attached to the still image data sets and/or digital video data sets.

16. A computer-readable medium storing a program as defined in claim 14, wherein the order specifying conditions are based on accompanying information attached to the still image data sets and/or digital video data sets.

17. A computer-readable medium storing a program as defined in claim 15, wherein the accompanying information includes at least one item of information comprising the date and time of photography, a file name, a photography location, and a data size regarding each of the still image data sets and/or digital video data sets.

18. A computer-readable medium storing a program as defined in claim 16, wherein the accompanying information includes at least one item of information comprising the date and time of photography, a file name, a photography location, and a data size regarding each of the still image data sets and/or digital video data sets.

19. An image generation method as defined in claim 1, wherein said order specifying conditions are input by a user.

20. An image generation apparatus as defined in claim 7, wherein said order specifying conditions are input by a user.

21. A computer-readable medium storing a program as defined in claim 13, wherein said order specifying conditions are input by a user.

22. An image generation method as defined in claim 1, wherein the order specifying conditions are based on accompanying information attached to the still image data sets and/or digital video data sets.

23. An image generation method as defined in claim 22, wherein the accompanying information includes at least one item of information comprising the date and time of photography, a file name, a photography location, and a data size regarding each of the still image data sets and/or digital video data sets.

* * * * *